United States Patent
Paatero

(10) Patent No.: US 7,930,537 B2
(45) Date of Patent: Apr. 19, 2011

(54) ARCHITECTURE FOR ENCRYPTED APPLICATION INSTALLATION

(75) Inventor: Lauri Paatero, Helsinki (FI)

(73) Assignee: Nokia Corporation, Espoo (FI)

( * ) Notice: Subject to any disclaimer, the term of this patent is extended or adjusted under 35 U.S.C. 154(b) by 852 days.

(21) Appl. No.: 10/771,836

(22) Filed: Feb. 3, 2004

(65) Prior Publication Data

US 2004/0176068 A1 Sep. 9, 2004

(30) Foreign Application Priority Data

Feb. 3, 2003 (WO) .................. PCT/IB03/00343

(51) Int. Cl.
- *H04L 29/06* (2006.01)
- *G06F 11/30* (2006.01)
- *G06F 12/14* (2006.01)
- *H04K 1/00* (2006.01)
- *H04L 9/08* (2006.01)

(52) U.S. Cl. ........ 713/165; 713/156; 713/194; 380/287; 380/278

(58) Field of Classification Search .................. 380/281, 380/278; 713/156, 194

See application file for complete search history.

(56) References Cited

U.S. PATENT DOCUMENTS

| | | | | |
|---|---|---|---|---|
| 5,805,706 | A * | 9/1998 | Davis | 713/153 |
| 6,098,056 | A * | 8/2000 | Rusnak et al. | 705/75 |
| 6,647,495 | B1 * | 11/2003 | Takeuchi et al. | 713/189 |
| 6,839,837 | B1 | 1/2005 | Morishita | 713/164 |
| 7,051,211 | B1 * | 5/2006 | Matyas et al. | 713/187 |
| 7,055,040 | B2 * | 5/2006 | Klemba et al. | 713/156 |
| 2002/0031225 | A1 | 3/2002 | Hines | |
| 2002/0099940 | A1 | 7/2002 | Wang | |
| 2002/0116625 | A1 | 8/2002 | Sato | 713/194 |
| 2002/0129245 | A1 * | 9/2002 | Cassagnol et al. | 713/168 |
| 2003/0108204 | A1 * | 6/2003 | Audebert et al. | 380/277 |
| 2003/0163685 | A1 | 8/2003 | Paatero | |
| 2004/0101141 | A1 * | 5/2004 | Alve | 380/278 |

FOREIGN PATENT DOCUMENTS

| | | |
|---|---|---|
| EP | 1217850 A1 | 6/2002 |
| WO | WO 02/44995 A2 | 6/2002 |
| WO | WO 03/009285 | 1/2003 |

OTHER PUBLICATIONS

"Architectural Support for Copy and Tamper Resistant Software" by David J. Lie et al, Proceedings of the 9th International Conference on Architectural Support for Programming Languages and Operating Systems (ASPLOS-IX), Nov. 2000, pp. 169-177.

(Continued)

*Primary Examiner* — Shin-Hon Chen

(57) ABSTRACT

Methods and systems are arranged to control the decryption of an encrypted application in a device executing the application, the device arranged with a secure environment to which access is strictly controlled by a device processor. The application is divided into an installation part that establishes proper set up of the application and a protected part which is to be executed in the secure environment. An advantage with the invention is that the application provider has the freedom to control the decryption of the application software. Since it is performed in the secure environment, the owner of the device is unable to access the application and thereby copy, read or manipulate it. Moreover, the application provider handles the installation of the encrypted application and the key for decrypting the application, and is thus given the possibility to handle the encryption/decryption schemes and the key management.

32 Claims, 3 Drawing Sheets

OTHER PUBLICATIONS

English language translation of Japanese Office Action (Notice of Reasons for Rejection) dated Mar. 17, 2009, 7 pages.
English language Abstract of Japanese Unexamined Patent Publication JP2002-305515 to Matsushita Electric Ind. Co. Ltd., published Oct. 18, 2002 (2 pages).
English language Abstract of Japanese Unexamined Patent Publication JP11-328032 to Nippon Electric Co., published Nov. 30, 1999 (2 pages).
English language Abstract of Japanese Unexamined Patent Publication JP10-301773 to Sony Corp., published Nov. 13, 1998 (2 pages).
English language Abstract of Japanese Unexamined Patent Publication JP2002-244989 to Nippon Electric Co., published Aug. 30, 2002 (2 pages).
Japanese Patent Office; F. Kanasawa; "Decision of Final Rejection"; whole document; May 18, 2010; with English translation and Pending Claims in English.

* cited by examiner

ARCHITECTURE FOR ENCRYPTED APPLICATION INSTALLATION

CROSS REFERENCE TO RELATED APPLICATION

This application claims priority from International Application Number PCT/IB03/00343 filed Feb. 3, 2003.

TECHNICAL FIELD OF THE INVENTION

The present invention relates to methods for providing, and systems arranged to provide, an application to be executed on a device, the device being arranged with a secure environment to which access is strictly controlled by a device processor.

BACKGROUND ART

Various electronic devices, such as mobile telecommunication terminals, portable computers and PDAs require access to security related components such as application programs, cryptographical keys, cryptographical key data material, intermediate cryptographical calculation results, passwords, authentication of externally downloaded data etc. It is often necessary that these components, and the processing of them, is kept secret within the electronic device. Ideally, they shall be known by as few people as possible. This is due to the fact that a device, for example a mobile terminal, could possibly be tampered with if these components are known. Access to these types of components might aid an attacker with the malicious intent to manipulate a terminal.

Therefore, a secure execution environment is introduced in which environment a processor within the electronic device is able to access the security related components. Access to the secure execution environment, processing in it and exit from it should be carefully controlled. Prior art hardware comprising this secure environment is often enclosed within a tamper resistant packaging. It should not be possible to probe or perform measurements and tests on this type of hardware which could result in the revealing of security related components and the processing of them.

Providers of application programs encrypt the programs so as to create tamper resistant software. Only when the application program code is executed in a secure environment, is the code decrypted and managed as plain text.

David Lie et al, "Architectural Support for Copy and Tamper Resistant Software", published in Proceedings of the 9th International Conference on Architectural Support for Programming Languages and Operating Systems (ASPLOS-IX), November, 2000, Pp 169-177 discloses a system called XOM, execute Only Memory. Every XOM processor has a public/private key pair, and the private key is kept in hardware and known only to the processor, not to the owner of the processor or anyone else. When XOM software is purchased, the software undergoes encryption, by means of this public/private key pair. The executable code is decrypted by the processor just before execution and the plaintext code never leaves the processor chip. A problem with this type of architecture is that the application providers have very limited possibilities to define the way the application is handled during application installation.

SUMMARY OF THE INVENTION

It is an object of the present invention to mitigate the above stated problem, as well as providing a system which facilitates modifications in key management and encryption systems.

This object is achieved by methods for providing an application to be executed on a device, the device being arranged with a secure environment to which access is strictly controlled by a device processor, and systems arranged to provide an application to be executed on a device, the device being arranged with a secure environment to which access is strictly controlled by a device processor.

According to a first aspect of the invention, a method is provided in which the device is provided with an encrypted application and, via a secure channel into the secure environment, a first key for decrypting the encrypted application. The encrypted application is decrypted in the secure environment by means of the first key. Further, the application is re-encrypted in the secure environment by means of a second key and the re-encrypted application is then stored outside the secure environment.

According to a second aspect of the invention, a method is provided in which the device is provided with an encrypted application and, via a secure channel into the secure environment, a first key for decrypting the encrypted application. Further, the first key is encrypted in the secure environment by means of a second key and the encrypted key is then stored outside the secure environment.

According to a third aspect of the invention, a system is provided, wherein means is arranged to provide the device with an encrypted application and, via a secure channel into the secure environment, a first key for decrypting the encrypted application. Means is arranged to decrypt the encrypted application in the secure environment using the first key. Further, means is arranged to re-encrypt the application in the secure environment using a second key and the re-encrypted application is then stored outside the secure environment.

According to a fourth aspect of the invention, a system is provided, wherein means is arranged to provide the device with an encrypted application and, via a secure channel into the secure environment, a first key for decrypting the encrypted application. Further, the means is arranged to encrypt the first key in the secure environment using a second key and the encrypted key is then stored outside the secure environment.

The invention is based on the idea that an application is downloaded to a device which is arranged to execute the application. The application is divided into an installation part that establishes proper set up of the application and a protected part which is to be executed in the secure environment. The installation part produces an encrypted application, i.e. the protected part, and keys for decrypting it. The installation part might be encrypted using some arrangement known in the prior art. In this phase of the application installation, the downloaded data is held in a part of the device having milder security requirements than the secure environment. This part is hereinafter referred to as the unsecure environment. When the application is downloaded into the device, the installation part establishes a secure channel with a server that, on the secure channel, provides a first key into the secure environment of the device, with which first key it is possible to decrypt the encrypted application. It might be necessary for the device to authenticate itself in order to receive the first key. When the encrypted application is to be executed, it is loaded into the secure environment and decrypted by the first key. The application is now in plain text and can be executed. When there is no desire to execute the application, it is re-encrypted by means of a second key and stored outside the secure environment, i.e. in the unsecure environment. An advantage with this inventive idea is that the application provider has the freedom to control the decryption of the application software. Since it is performed in the secure environment, the owner of the device, the device being e.g. a mobile phone, is unable to access the application and thereby copy, read or manipulate it. Moreover, the application provider handles the installation of the encrypted application and the key for decrypting the application, and is thus given the possibility to handle the encryption/decryption schemes and the key management. The only part that has to stay fixed is the loading part of the application, i.e. the part of the application which loads data into the secure environment and handles the decryption of the encrypted application. A further advantage is that the application can be re-encrypted in the secure environment by a second key and stored outside the secure environment. When the application is not executed, it is not stored in the secure environment. Secure environment memory is relatively expensive compared to unsecure environment memory located. As soon as the application is to be executed again, the re-encrypted application is loaded into the secure environment and decrypted by means of the second key.

According to an embodiment of the invention, the first key is encrypted in the secure environment by means of the second key. The encrypted first key is then stored outside the secure environment. This embodiment has the advantage that the first key can be used in future downloads of applications. All that has to be done is to encrypt the first key in the secure environment with the second key and store the encrypted first key outside the secure environment. The first key can then be used to decrypt a downloaded encrypted application in the secure environment. This is done by loading the encrypted first key into the secure environment and decrypting it with the second key. This means that the installation step, including setting up a secure channel, of the first key need not be employed. This is particularly useful in production and/or in the development phase, wherein a large number of applications might be downloaded to the device in a rather short time.

According to another embodiment of the present invention, the second key is symmetric and derived from the application in such a way that the second key is comprised in the application itself and extracted when the application is loaded into the secure environment and decrypted by the first key. This has the advantage that the application provider is given the freedom to decide which key to be used in the encryption/decryption relating to the second key. The second key management can then be controlled by the application provider. The fact that the second key is symmetric implies that the encryption/decryption using the second key will be less computationally demanding compared to if it had been asymmetric.

According to yet another embodiment of the present invention, the second key is symmetric and derived from the application using an application seed. By using an application seed in the form of, for example, an application serial number, it is possible to create the second key. The serial number is encrypted by means of an appropriate algorithm in the secure environment using a device generated static key, and this operation creates the symmetric second key. This embodiment has the advantage that the second key must not be distributed, but it can be generated rather easily in the secure environment.

Further features of, and advantages with, the present invention will become apparent when studying the appended claims and the following description. Those skilled in the art realize that different features of the present invention can be combined to create embodiments other than those described in the following. Many different alterations, modifications and combinations will become apparent for those skilled in the art. The described embodiments are therefore not intended to limit the scope of the invention, as defined by the appended claims.

BRIEF DESCRIPTION OF THE DRAWINGS

The present invention will be described in greater detail with reference to the following drawings, wherein.

DESCRIPTION OF PREFERRED EMBODIMENTS OF THE INVENTION

Figure 1:
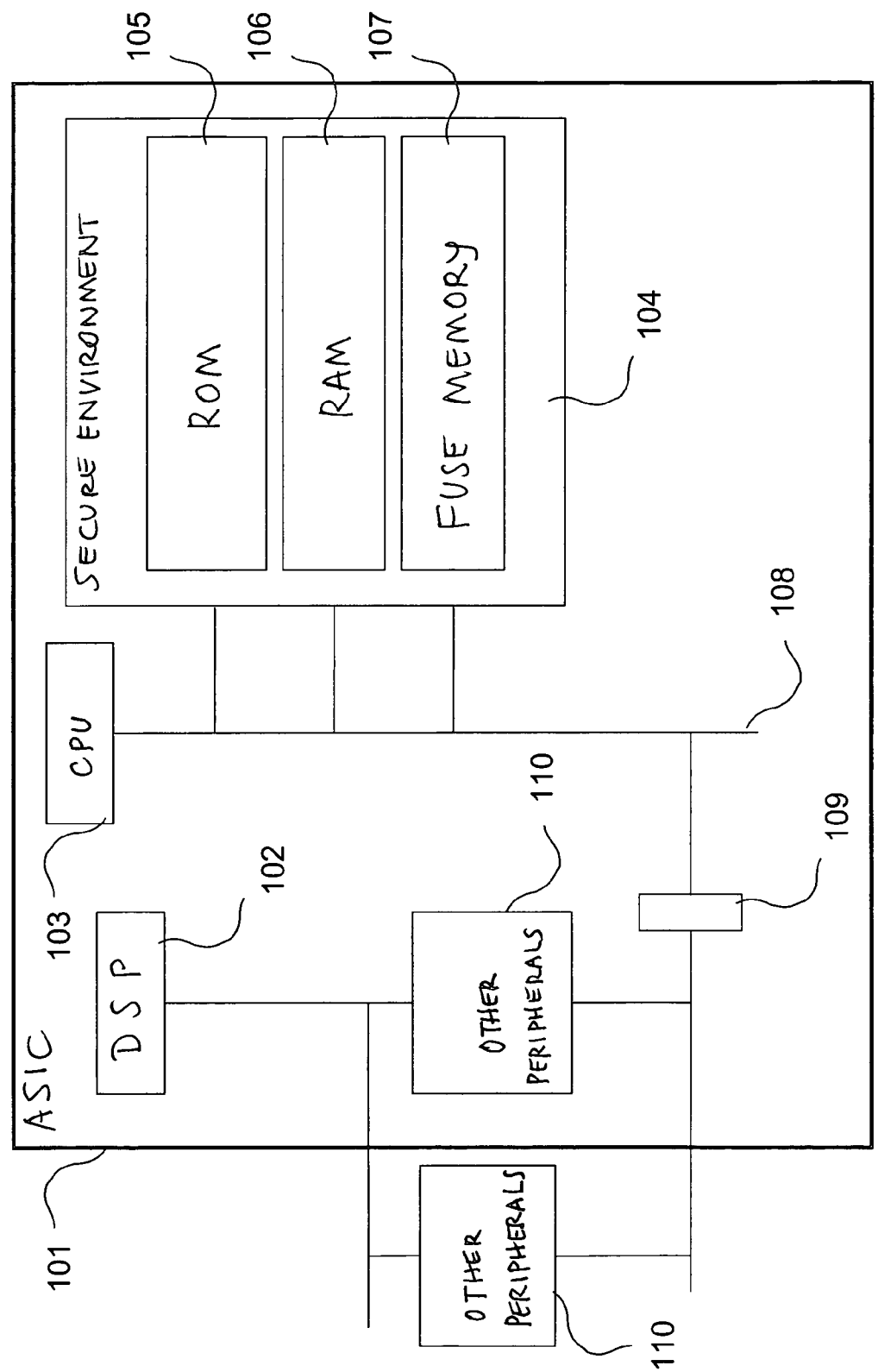
FIG. 1 shows a schematic block diagram of a device architecture for providing data security in which device the present invention advantageously can be applied.

A device architecture for providing data security is shown in FIG. 1. Such a system is further disclosed in the Applicant's international patent applications PCT/IB02/03216, (U.S. equivalent Ser. No. 10/634,734 filed Aug. 8, 2003) which application is incorporated herein by reference for background. The device is implemented in the form of an ASIC (Application Specific Integrated Circuit) 101. The processing part of the architecture contains a CPU 103 and a digital signal processor (DSP) 102.

The secure environment 104 comprises a ROM 105 from which the ASIC 101 is booted. This ROM 105 contains boot application software and an operating system. Certain application programs residing in the secure environment 104 have precedence over other application programs. In a mobile telecommunication terminal, in which the ASIC 101 can be arranged, a boot software should exist, which software includes the main functionality of the terminal. It is not possible to boot the terminal to normal operating mode without this software. This has the advantage that by controlling this boot software, it is also possible to control the initial activation of each terminal.

The secure environment 104 also comprises RAM 106 for storage of data and applications. The RAM 106 preferably stores so called protected applications, which are smaller size applications for performing security critical operations inside the secure environment 104. Normally, the way to employ protected applications is to let "normal" applications request services from a certain protected application. New protected applications can be downloaded into the secure environment 104 at any time, which would not be the case if they would reside in ROM. Secure environment 104 software controls the download and execution of protected applications. Only signed protected applications are allowed to run. The protected applications can access any resources in the secure environment 104 and they can also communicate with normal applications for the provision of security services.

In the secure environment 104, a fuse memory 107 is comprised containing a unique random number that is generated and programmed into the ASIC 101 during manufacturing. This random number is used as the identity of a specific ASIC 101 and is further employed to derive keys for cryptographic operations. The architecture further comprises a standard bridge circuit 109 for limitation of data visibility on the bus 108. The architecture should be enclosed within a tamper resistant packaging. It should not be possible to probe or perform measurements and tests on this type of hardware which could result in the revealing of security related components and the processing of them. The DSP 102 has access to other peripherals 110 such as a direct memory access (DMA) unit, RAMs, flash memories and additional processors can be provided outside the ASIC 101.

By providing the above described architecture in which the CPU 103 is operable in two different modes, one secure operating mode and one unsecure operating mode, the CPU 103 of the device 101 can be enabled to execute non-verified software downloaded into the device 101. This is due to the fact that only verified software has access to the secure environment 104. This allows testing, debugging and servicing of the mobile telecommunication terminal and its software without risking that a third party is given access to information which makes it possible to manipulate the security related components of the device 101 so as to affect the security functions when in the secure environment 104.

In the secure mode, the processor 103 has access to security related data located within the secure environment 104. The security data include cryptographical keys and algorithms, software for booting the circuitry, secret data such as random numbers used as cryptographical key material, application programs etc. The device 101 can advantageously be used in mobile telecommunication terminals, but also in other electronic devices such as computers, PDAs or other devices with a need for data protection. The access to these security data and the processing of them need to be restricted, since an intruder with access to security data could manipulate the terminal. When testing and/or debugging the terminal, access to security information is not allowed. For this reason, the processor 103 is placed in the unsecure operating mode, in which mode it is no longer given access to the protected data within the secure environment 104.

Figure 2:
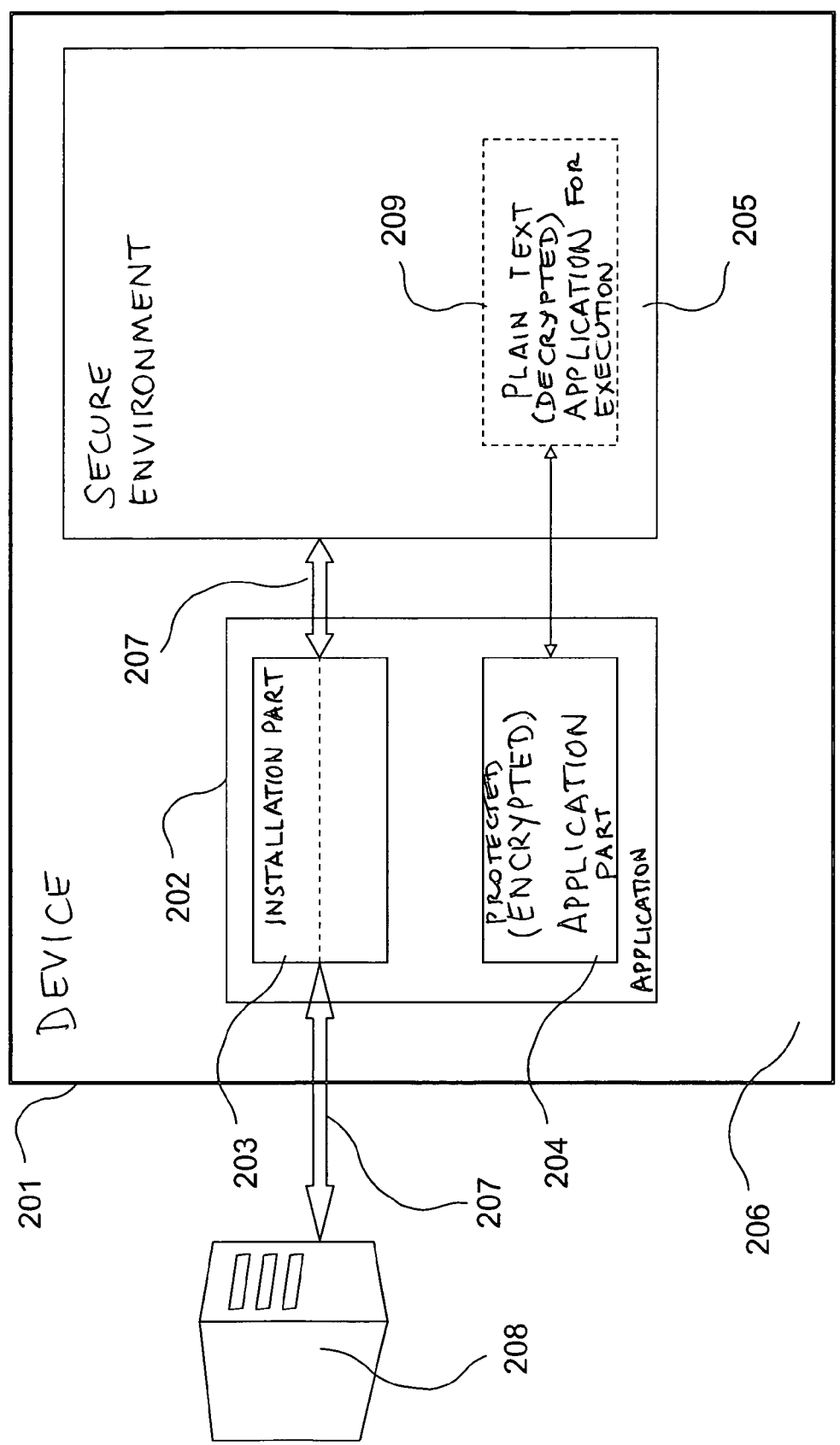
FIG. 2 shows a schematic block diagram of how the encrypted application is loaded into the secure environment and decrypted into plain text, i.e. into executable form, according to an embodiment of the invention.

FIG. 2 shows a schematic block diagram of how the encrypted application is loaded into the secure environment and decrypted into plain text, i.e. into executable form. First, an application 202 is loaded into a device 201 which is arranged to execute the application 202. The application 202 is divided into an installation part 203 that establishes proper set up of the application 202 and a protected part 204 which is to be executed in the secure environment 205. The installation part 203 produces an encrypted application, i.e. the protected part 204, and keys for decrypting it. The installation part 203 is not encrypted. At this stage of the installation, the application 202 is held in the unsecure environment 206. When the application 202 is loaded into the device 201, the installation part 203 establishes a secure channel 207 with a server 208 that, on the secure channel 207, provides a first key into the secure environment 205 of the device 201, with which first key it is possible to decrypt the encrypted application 204. The secure channel 207 can be created in a number of different ways. It is, for example, possible to encrypt the first key at the server 208 by using the public key of the device 201. It is decrypted with the private key of the device 201 in the secure environment 205. Thus, a secure channel is provided. It is also possible to use the SSL protocol to transfer the first key into the secure environment 205. The key issue is that the first key is encrypted in such a way that a third party is unable to eavesdrop on the channel 207 and catch a plain text version of the first key. When the encrypted application 204 is to be executed, it is loaded into the secure environment 205 and decrypted by the first key. The protected application is now in plain text 209 and can be executed. When there is no desire to execute the plain text application 209 in the secure environment 205, it is re-encrypted by means of a second key and stored in the unsecure environment 206.

Figure 3:
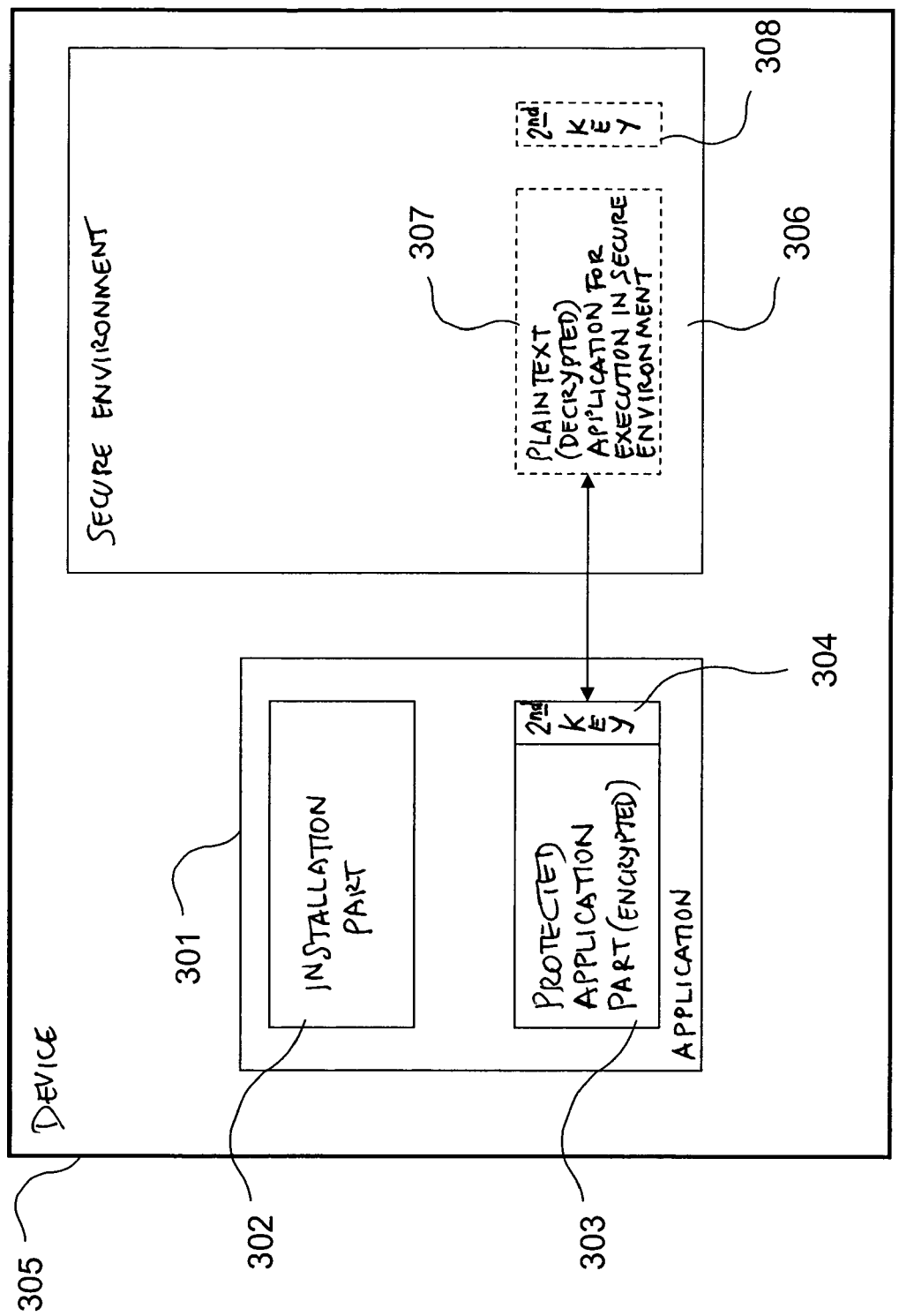
FIG. 3 shows how the symmetric second key is derived from the application according to an embodiment of the invention.

The second key is symmetric and can be derived from the application in different ways. Referring to FIG. 3, which shows the application 301 that is downloaded to the device 305, including the installation part 302 and the protected application part (also referred to herein as the encrypted application) 303. The second key is denoted by 304 and is attached to the application code itself. Note that the second key forms part of the protected application 303 and is consequently also encrypted by means of the first key. The second key is extracted when the protected application 303 is loaded into the secure environment 306 and decrypted by the first key. The application 307 as well as the second key 308 is then in plain text. The second key can also be derived from the application using an application seed. By using an application seed in the form of, for example, an application serial number, it is possible to create the second key. The serial number is encrypted by means of an appropriate algorithm in the secure environment using a device generated static key, and this operation creates the symmetric second key. This operation is called diversification.

Referring again to FIG. 2, according to an embodiment of the invention, the first key is encrypted in the secure environment 205 by means of the second key. The encrypted first key is then stored in the unsecure environment 206. This embodiment has the advantage that the first key can be used in future downloads of applications 202. All that has to be done is to encrypt the first key in the secure environment 205 with the second key and store the encrypted first key in the unsecure environment 206. The first key can then be used to decrypt a downloaded encrypted application 204 in the secure environment 205. This is done by loading the encrypted first key into the secure environment 205 and decrypting it with the second key. The protected application 204 is then decrypted with the first key. This means that the installation step, including setting up a secure channel 207, of the first key need not be employed. This is particularly useful in production and/or in the development phase, wherein a large number of applications 202 might be downloaded to the device 201 in a rather short time. In production and/or in the development phase, it is also advantageous to transfer multiple keys successively on the secure channel into the secure environment, since each key later can be used to decrypt an encrypted application that corresponds to that key the in the secure environment.

It should be noted that the above mentioned embodiments exemplify the invention, and that those skilled in the art will be able to design many alternative embodiments without departing from the scope of the appended claims. The word "comprising" does not exclude the presence of elements or steps other than those listed in a claim. The word "a" or "an" preceding an element does not exclude the presence of a plurality of such elements. In the device claims enumerating several means, several of these means can be embodied by one and the same item of hardware.

The invention claimed is:

1. A method, comprising:
   receiving, in a secure environment in a terminal, via a secure channel established by an installation part of an application previously stored in said terminal outside said secure environment, from a server outside said terminal, a first key for decrypting an encrypted part of said application;
   loading said encrypted part of said application from storage outside said secure environment into said secure environment;
   decrypting, in the secure environment, said encrypted part of said application by means of said first key for execution in said secure environment;

re-encrypting, in said secure environment, the application by means of a second key; and storing, outside said secure environment, the re-encrypted part of said application.

2. The method according to claim 1, the method comprising:
encrypting, in said secure environment, said first key by means of the second key; and
storing, outside said secure environment, the encrypted first key.

3. The method according to claim 1, wherein said second key is symmetric and can be derived from the application.

4. The method according to claim 3, wherein said second key is comprised in the encrypted part of said application.

5. The method according to claim 3, wherein said second key is generated in the secure environment using an application seed.

6. The method according to claim 1, wherein multiple keys can be transferred successively on the secure channel into the secure environment, each key being used to decrypt a corresponding encrypted application in the secure environment.

7. The method of claim 6, further comprising:
encrypting, in said secure environment, each of said multiple keys by means of the second key; and
storing, outside said secure environment, each of the multiple keys encrypted by the second key.

8. The method of claim 7, further comprising:
receiving a plurality of encrypted applications in the terminal and storing same outside said secure environment;
loading one of said plurality of encrypted applications into the secure environment;
loading a corresponding one of said plurality of encrypted multiple keys stored outside said secure environment into said secure environment;
decrypting the corresponding encrypted key by means of the second key; and
decrypting the loaded encrypted application by means of the decrypted corresponding key.

9. A method, comprising:
storing an application outside a secure environment in a terminal;
receiving, in said secure environment in said terminal, via a secure channel established by an installation part of said application, from a server outside said terminal, a first key for decrypting an encrypted part of said application;
loading said encrypted part of said application from storage outside said secure environment into said secure environment for decryption by said first key and execution in said secure environment;
encrypting, in said secure environment, said first key by means of a second key; and
storing, outside said secure environment, the encrypted first key.

10. The method of claim 9, wherein said second key is symmetric and can be derived from the application.

11. The method of claim 10, wherein said second key is comprised in the encrypted part of the application.

12. The method of claim 10, wherein said second key is generated in the secure environment using an application seed.

13. The method of claim 9, wherein multiple keys can be transferred successively on the secure channel into the secure environment, each key being used to decrypt a corresponding encrypted application in the secure environment.

14. The method of claim 9, further comprising
receiving another encrypted application in the terminal;
loading the encrypted first key from outside said secure environment;
decrypting the encrypted first key with the second key; and
decrypting the other encrypted application with the decrypted first key.

15. The method of claim 14, further comprising:
re-encrypting the first key by means of the second key; and
storing, outside said secure environment, the encrypted first key.

16. Apparatus, comprising:
a processor; and
a memory including computer program code, the memory and the computer program code configured to with the processor, cause the apparatus at least to:
receive in a secure environment of said apparatus, via a secure channel established by an installation part of an application previously stored in said apparatus outside said secure environment, from a server outside said apparatus, a first key for decrypting an encrypted part of said application;
load said encrypted part of said application from outside said secure environment into said secure environment and decrypt, in the secure environment, said encrypted part of said application by means of said first key for execution in said secure environment;
re-encrypt, in said secure environment, the application based on a second key decrypted from said encrypted part of said application; and
store in said apparatus, outside said secure environment, the re-encrypted application.

17. The apparatus according to claim 16, wherein said memory and the computer program code are configured to, with the processor, cause the apparatus to:
encrypt, in said secure environment, said first key by means of the second key; and
store in said apparatus, outside said secure environment, the encrypted first key.

18. The apparatus according to claim 16, wherein said second key is symmetric and can be derived from the application.

19. The apparatus according to claim 18, wherein said second key is comprised in the encrypted part of said application.

20. The apparatus according to claim 18, wherein said second key is generated in the secure environment using an application seed.

21. The apparatus according to claim 16, wherein the apparatus is arranged such that multiple keys can be transferred successively on the secure channel into the secure environment, each key being used to decrypt a corresponding encrypted application in the secure environment.

22. The apparatus of claim 21, wherein said memory and the computer program code are configured to, with the processor, cause the apparatus to:
encrypt, in said secure environment, each of said multiple keys by means of the second key; and
store, outside said secure environment, each of the multiple keys encrypted by the second key.

23. The apparatus of claim 22, wherein said memory and the computer program code are configured to, with the processor, cause the apparatus to:
receive a plurality of encrypted applications;
to store same outside said secure environment;
to load a selected one of said plurality of encrypted applications into the same environment;

load a corresponding one of said plurality of encrypted multiple keys stored outside said secure environment into said secure environment;

decrypt the corresponding encrypted key by means of the second key; and decrypt the loaded selected encrypted application by means of the decrypted corresponding key.

24. Apparatus, comprising:

a processor; and a memory including computer program code, the memory and the computer program code configured to, with the processor, cause the apparatus at least to:

receive, in a secure environment of said apparatus, via a secure channel established by an installation part of an application previously stored in said apparatus outside said secure environment, from a server outside said apparatus, a first key for decrypting an encrypted part of said application;

load said encrypted part of said application from storage in said apparatus outside said secure environment into said secure environment for decryption by said first key and for execution in said secure environment;

encrypt, in said secure environment, said first key by means of a second key; and store in said apparatus, outside said secure environment, the first key encrypted by the second key.

25. The method of claim 24, wherein said second key is symmetric and can be derived from the application.

26. The method of claim 25, wherein said second key is comprised in the encrypted part of the application.

27. The method of claim 24, wherein the apparatus is arranged such that multiple keys can be transferred successively on the secure channel into the secure environment, each key being used to decrypt a corresponding encrypted application in the secure environment.

28. The apparatus of claim 24, wherein said memory and the computer program code are configured to, with the processor, cause the apparatus to:

load the encrypted first key from outside said secure environment;

decrypt the encrypted first key with the second key; and decrypt with the decrypted first key another encrypted application loaded into the secure environment.

29. The apparatus of claim 28, wherein said memory and the computer program code are configured to, with the processor, cause the apparatus to:

re-encrypt the first key by means of the second key; and store, outside said secure environment, the encrypted first key.

30. A terminal device comprising:

a processor; and a memory including computer program code, the memory and the computer program code configured to, with the processor, cause the terminal device at least to:

load an encrypted application into a secure environment of said terminal device;

decrypt said encrypted application in said secure environment using a first key provided over a secure channel from a server external to said terminal device;

re-encrypt said application in said secure environment by means of a second key; and store the re-encrypted application outside said secure environment.

31. The terminal device of claim 30, wherein said first key is encrypted by said server using a public key belonging to said terminal device for providing said first key from said server to said terminal device for decryption of said first key by a private key of said terminal device in said secure environment of said terminal device.

32. An integrated circuit for installation in a terminal comprising a secure environment, said secure environment responsive to a first key from a server outside said terminal received over a secure channel for decrypting within said secure environment an encrypted application loaded from an insecure environment in said terminal, for executing said decrypted application within said secure environment and for encrypting said first key with a second key belonging to said terminal device for storage in said terminal outside said secure environment so that said first key can be used again within said secure environment without need for receipt again of said first key from said server.

* * * * *